(12) United States Patent
DiSalvo

(10) Patent No.: US 6,657,834 B2
(45) Date of Patent: *Dec. 2, 2003

(54) RESET LOCKOUT FOR CIRCUIT INTERRUPTING DEVICE

(75) Inventor: Nicholas L. DiSalvo, Levittown, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/090,662

(22) Filed: Mar. 4, 2002

(65) Prior Publication Data

US 2002/0089800 A1 Jul. 11, 2002

Related U.S. Application Data

(63) Continuation of application No. 09/531,990, filed on Mar. 20, 2000, now Pat. No. 6,381,112, which is a continuation of application No. 09/138,955, filed on Aug. 24, 1998, now Pat. No. 6,040,967.

(51) Int. Cl.[7] ............................................... H02H 3/00
(52) U.S. Cl. ........................................................ 361/42
(58) Field of Search .......................... 361/42–50; 335/18, 335/21, 24, 26, 202

(56) References Cited

U.S. PATENT DOCUMENTS

| | | | | |
|---|---|---|---|---|
| 4,034,266 A | | 7/1977 | Virani et al. ................... | 361/42 |
| 4,595,894 A | * | 6/1986 | Doyle et al. ................... | 335/18 |
| 4,719,437 A | | 1/1988 | Yun ............................ | 335/18 |
| 4,802,052 A | | 1/1989 | Brant et al. .................... | 361/42 |
| 4,851,951 A | * | 7/1989 | Foster, Jr. ..................... | 361/50 |
| 5,223,810 A | | 6/1993 | Van Haaren ................... | 335/18 |
| 5,224,006 A | | 6/1993 | MacKenzie et al. ........... | 361/45 |
| 5,594,398 A | | 1/1997 | Marcou et al. ................ | 335/18 |
| 5,600,524 A | * | 2/1997 | Neiger et al. .................. | 361/42 |
| 5,805,397 A | | 9/1998 | MacKenzie .................... | 361/42 |
| 6,040,967 A | * | 3/2000 | DiSalvo ........................ | 361/42 |
| 6,246,558 B1 | | 6/2001 | DiSalvo et al. ................ | 361/42 |
| 6,282,070 B1 | | 8/2001 | Ziegler et al. ................. | 361/42 |
| 6,381,112 B1 | * | 4/2002 | DiSalvo ........................ | 361/42 |
| 6,437,953 B2 | | 8/2002 | DiSalvo et al. ................ | 361/42 |

* cited by examiner

Primary Examiner—Ronald W. Leja
(74) Attorney, Agent, or Firm—Paul J. Sutton

(57) ABSTRACT

Resettable circuit interrupting devices, such as GFCI devices, that include a reset lock-out mechanism are provided. The reset lock-out mechanism prevents the resetting of electrical connections between input and output conductors if the circuit interrupting mechanism used to break the connection is non-operational or if an open neutral condition exists.

13 Claims, 8 Drawing Sheets

RESET LOCKOUT FOR CIRCUIT INTERRUPTING DEVICE

This application is a continuation of Ser. No. 09/531,990, filed Mar. 20, 2000, now U.S. Pat. No. 6,381,112, which is a continuation of U.S. Ser. No. 09/138,955, filed Aug. 24, 1998 and now U.S. Pat. No. 6,040,967.

BACKGROUND

1. Field

The present application is directed to the family of resettable circuit interrupting devices and systems which include, without limitation, ground fault circuit interrupters (GFCI's), arc fault circuit interrupters (AFCI's), immersion detection circuit interrupters (IDCI's), appliance leakage circuit interrupters (ALCI's), circuit breakers, contactors, latching relays and solenoid mechanisms. More particularly, the present application is directed to a reset system in such devices and systems which is capable of being "locked out" such that it cannot be reset by a user if a portion of a circuit interrupting mechanism becomes non-operational or if an open neutral condition exists.

2. Description of the Related Art

The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters, for example. Presently available GFCI devices, such as the device described in commonly owned U.S. Pat. No. 4,595,894, use a trip mechanism to mechanically break an electrical connection between one or more input and output conductors. Such devices are resettable after they are tripped by, for example, the detection of a ground fault. In the device discussed in the '894 patent, the trip mechanism used to cause the mechanical breaking of the circuit (i.e., the connection between input and output conductors) includes a solenoid (or trip coil). A test button is used to test the trip mechanism and circuitry used to sense faults and a reset button is used to reset the electrical connection between input and output conductors.

However, instances may arise where an abnormal condition, caused by for example a lightening strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the ground fault protection available.

Further, an open neutral condition, which is defined in. Underwriters Laboratories (UL) Standard PAG 943A, may exist with the electrical wires supplying electrical power to such GFCI devices. If an open neutral condition exists with the neutral wire on the line (verses load) side of the GFCI device, an instance may arise where a current path is created from the phase (or hot) wire supplying power to the GFCI device through the load side of the device and a person to ground. In the event that an open neutral condition exists, current GFCI devices which have tripped, may be reset even though the open neutral condition may remain.

SUMMARY

The present application relates to resettable circuit interrupting devices, such as but not limited to GFCI devices, that include a reset lock-out mechanism which prevents the resetting of electrical connections (or continuity) between input and output conductors if the circuit interrupter used to break the connection is non-operational or if an open neutral condition exists.

The circuit interrupter includes a trip mechanism used to cause the mechanical or electrical breaking of continuity between the input and output conductive paths or conductors and the sensing circuitry used to sense faults.

In one embodiment, the circuit interrupting device includes a housing, an input conductive path and an output conductive path. Preferably, the input conductive path is disposed at least partially within the housing and is capable of being electrically connected to a source of electricity. Preferably, the output conductive path is also disposed at least partially within the housing and is capable of conducting electrical current to a load when electrical continuity is established with the input conductive path. Electrical continuity between the conductive paths may be established using electromechanical mechanisms, such as movable electrical contacts and solenoids, or using semiconductor type switching devices. The device also includes a circuit interrupter disposed within the housing and configured to break electrical continuity between the input and output conductive paths in response to the occurrence of a predetermined condition. Predefined conditions include, without limitation, ground faults, arc faults, appliance leakage faults, immersion faults and a test cycle.

In response to the occurrence of the predefined condition, a reset lock-out operable in a lock-out position or state and in a reset position or state is set to one of the states. In the lock-out position or state, the reset lock-out inhibits resetting of electrical continuity between the input and output conductive paths, and in the reset position or state, the reset lock-out does not inhibit resetting of electrical continuity between the input and output conductive paths. The circuit interrupting device also includes a reset mechanism operatively associated with the reset lock-out and the circuit interrupter. Activation of the reset mechanism activates the circuit interrupter which facilitates changing the operable position or state of the reset lock-out from the lock-out position or state to the reset position or state.

In another embodiment, the circuit interrupting device includes a housing, an input conductor disposed at least partially within the housing and capable of being electrically connected to a source of electricity, and an output conductor disposed at least partially within the housing and capable of conducting electrical current to a load when electrically connected to the input conductor. In this embodiment, electrical connections between the conductors may be established using electromechanical mechanisms or semiconductor type switching devices.

The device also includes a circuit interrupter that is disposed within the housing and configured to break the electrical connection between the input and output conductors in response to the occurrence of a predetermined condition. Again, predefined conditions include, without limitation, ground faults, arc faults, appliance leakage faults, immersion faults and a test cycle. In response to the occurrence of the predefined condition, a reset lock-out operable between a lock-out position (or state) and a reset position (or state) is set to one of the positions. In the lock-out position, the reset lock-out inhibits resetting of the electrical connection between the input and output conductors, and in the reset position, the reset lock-out does not inhibit resetting of the electrical connection between the input and output conductors. The circuit interrupting device also includes a reset mechanism operatively associated with the reset lock-out and the circuit interrupter. Activation of the reset mechanism activates the circuit interrupter which facilitates changing the operable position of the reset lock-out from the lock-out position to the reset position.

The circuit interrupter includes a trip mechanism and fault sensing circuitry. The trip mechanism may be an electromechanical mechanism (e.g., a solenoid or relay), a solid state mechanism or other mechanisms that may be used to break electrical continuity. A preferred electromechanical trip mechanism includes a coil assembly, a movable plunger and a banger. The movable plunger is responsive to energizing of the coil assembly, and the banger, which is attached to the plunger, moves when the plunger moves. Movement of the banger permits the reset lock-out to change operable positions.

Preferably, the reset mechanism includes a reset button that is coupled to the reset lock-out, and reset contacts that are activated when the reset button is depressed. When the reset button is depressed, the reset contacts close a circuit that, in the embodiment shown, activates the test cycle causing the circuit interrupter to activate permitting the reset lock-out to change operable positions.

This arrangement prevents the circuit interrupting device from being reset if the circuit interrupter is inoperative, since the circuit interrupter has to be activated in order to reset electrical continuity between the input and output conductive paths or conductors. In other words, this arrangement ensures that once the circuit interrupting device has been reset, it has the ability to again break electrical continuity between the input and output conductive paths because the sensing circuitry and trip mechanism of the circuit interrupter are utilized for resetting the continuity.

This arrangement also ensures that when such circuit interrupting devices are initially installed and energized the proper electrical connections have been made. For example, if the circuit interrupting device is a GFCI receptacle, improper electrical connections between input and output conductors on the receptacle and the line (hot) and load wires in a household junction box may cause a fault that is sensed by the circuit interrupter causing its trip mechanism to activate.

In addition, in the embodiments where the trip mechanism of the circuit interrupter uses power supplied to the device in order to activate, the arrangement of tying the resetting of the device with the operation of the circuit interrupter also prevents the circuit interrupting device from being reset if an open neutral condition exists with the wiring supplying electrical power to the device, since the circuit interrupter has to be activated in order to reset electrical continuity between the input and output conductive paths or conductors.

The present application also relates to a method for interrupting and resetting electrical connections in fault interrupting devices, such as the device above. The method involves sensing the occurrence of a predefined condition and breaking electrical continuity between input and output conductive paths or conductors when the predetermined condition is sensed. Preferably, a circuit interrupter having the above-described coil assembly, plunger and banger, is used to break continuity between the conductive paths.

After electrical continuity between the input and output conductive paths is broken, a lock-out mechanism is enabled so as to inhibit reestablishing electrical continuity between the input and output conductive paths. To reset the device, a reset mechanism is activated causing the circuit interrupter to operate and thus disable the lock-out mechanism and electrical continuity between the input and output conductive paths to be reestablished.

BRIEF DESCRIPTION OF THE DRAWINGS

Preferred embodiments of the present application are described herein with reference to the drawings in which similar elements are given similar reference characters, wherein.

DETAILED DESCRIPTION

Figure 1:
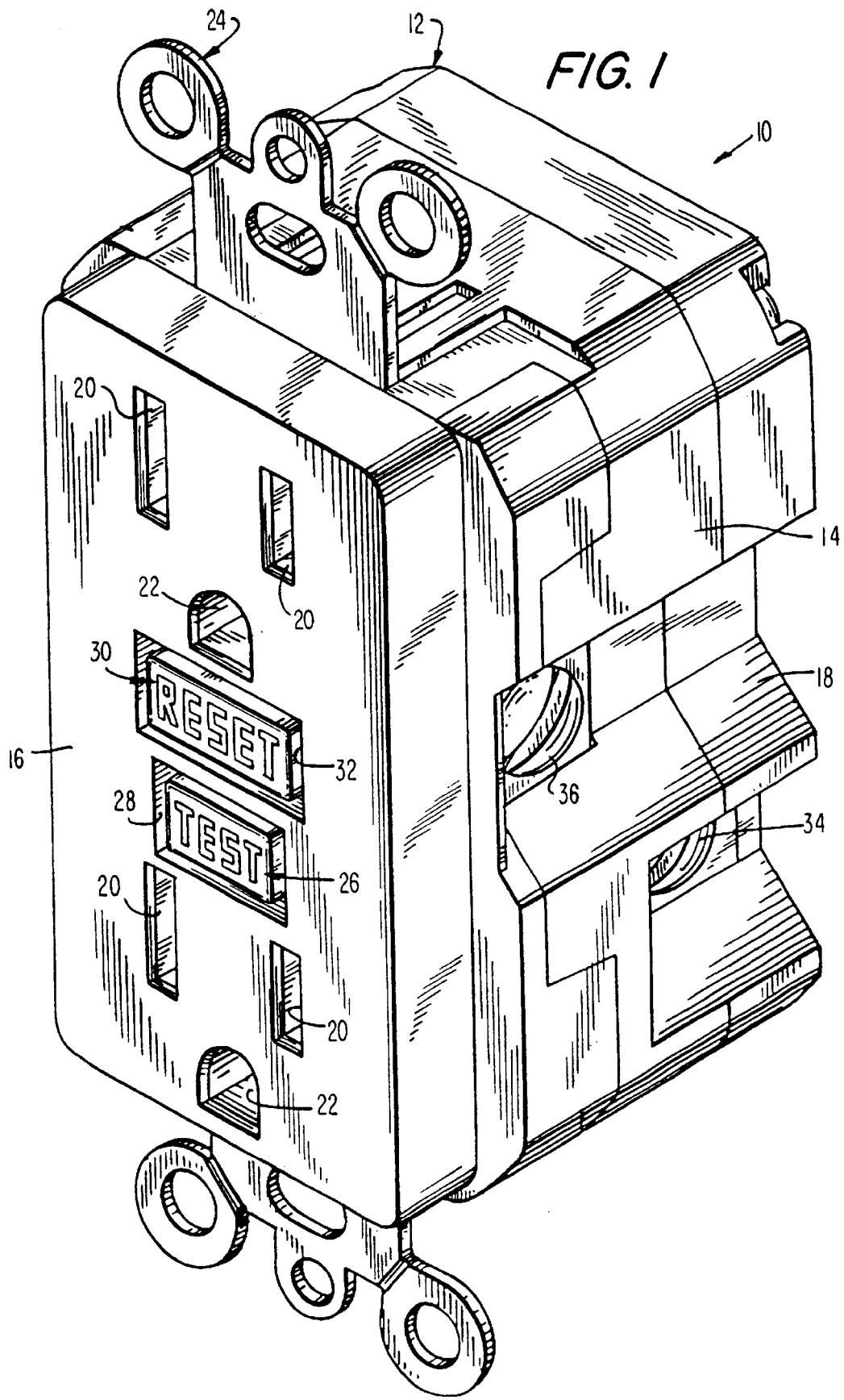
FIG. 1 is a perspective view of a ground fault circuit interrupting device according to the present application.

The present application provides a reset lock-out mechanism for resettable circuit interrupting devices, such as GFCI devices, that relates the resetting of electrical connections between input and output conductive paths or conductors to the operation of a circuit interrupter or circuit interrupting mechanism.

For the purposes of the present application, the reset lock-out mechanism according to the present application shown in the drawings and described hereinbelow is incorporated in a GFCI receptacle suitable for installation in a single-gang junction box in a home. However, the reset lock-out mechanism according to the present application can be included in any of the various devices in the family of resettable circuit interrupting devices, including ground fault circuit interrupters (GFCI's), arc fault circuit interrupters (AFCI's), immersion detection circuit interrupters (IDCI's), appliance leakage circuit interrupters (ALCI's).

Turning now to FIG. 1, the GFCI receptacle 10 has a housing 12 consisting of a relatively central body 14 to which a face or cover portion 16 and a rear portion 18 are removably secured. The face portion 16 has entry ports 20 for receiving normal or polarized prongs of a male plug of the type normally found at the end of a lamp or appliance cord set (not shown), as well as ground-prong-receiving openings 22 to accommodate a three-wire plug. The receptacle also includes a mounting strap 24 used to fasten the receptacle to a junction box.

A test button 26 extends through opening 28 in the face portion 16 of the housing 12. The test button is used to activate a test cycle, which test the operation of a circuit interrupter (or circuit interrupting mechanism) disposed in the device. The circuit interrupter, to be described in more detail below, is used to break electrical continuity between input and output conductive paths (or conductors). A reset button 30 forming a part of a reset mechanism extends through opening 32 in the face portion 16 of the housing 12. The reset button is used to activate a reset cycle, which reestablishes electrical continuity between the input and output conductive paths or conductors.

Electrical connections to existing household electrical wiring are made via binding screws 34 and 36, where screw 34 is an input (or line) connection point and screw 36 is an output (or load) connection point. It should be noted that two additional binding screws (not shown) are located on the opposite side of the receptacle 10. Similar to binding screws 34 and 36, these additional binding screws provide input and output connection points. Further, the input connections are for line side phase (hot) and neutral conductors of the household wiring, and the output connections are for load side phase (hot) and neutral conductors of the household wiring. The plug connections are also considered output conductors. A more detailed description of a GFCI receptacle is provided in U.S. Pat. No. 4,595,894 which is incorporated herein in its entirety by reference.

Figure 2:
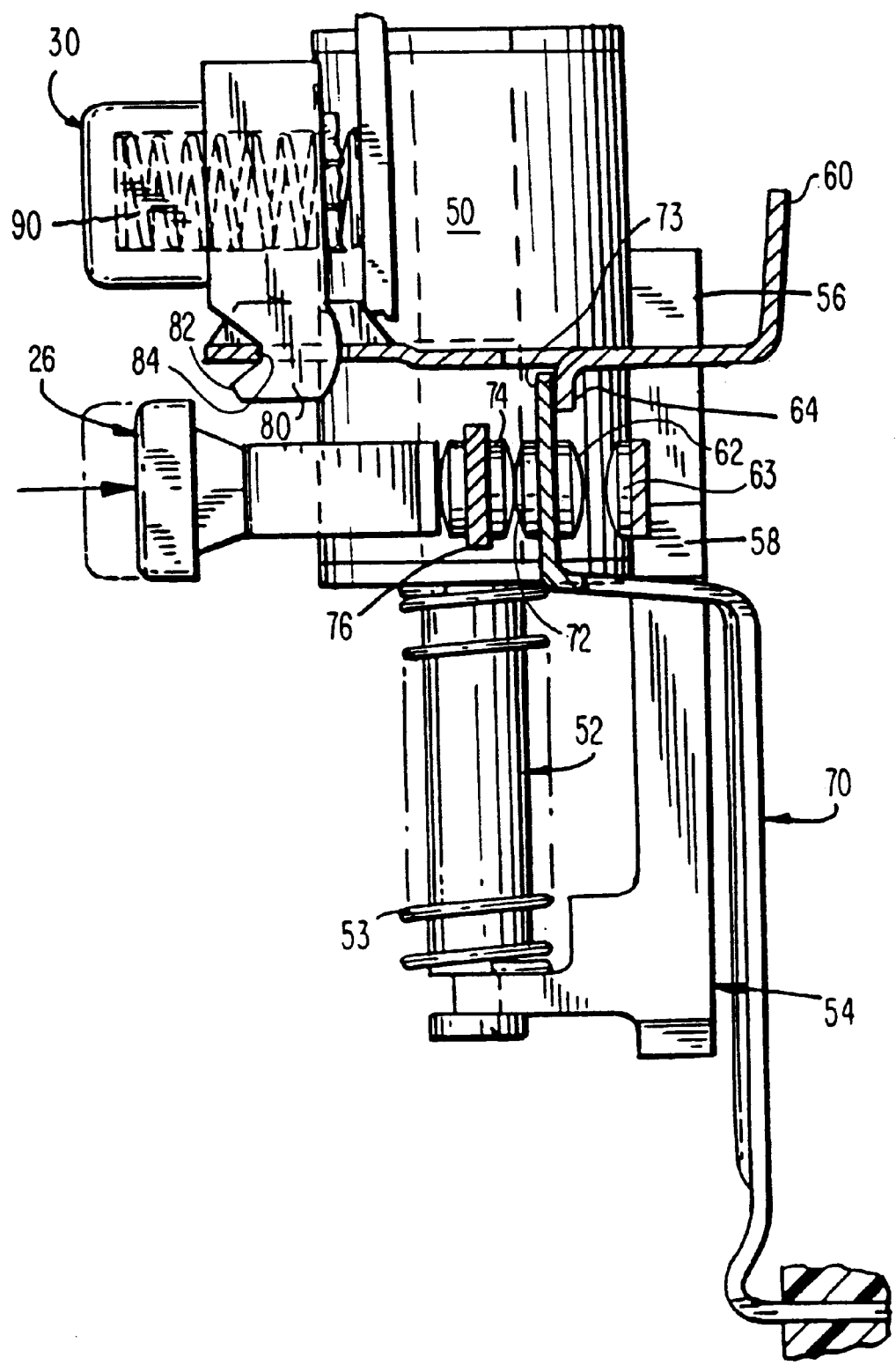
FIG. 2 is side elevational view, partly in section, of a reset mechanism for the GFCI device shown in FIG. 1, illustrating components of the reset mechanism and the GFCI device in a set or circuit making position.

Referring now to FIG. 2 there is shown mechanical components of trip and reset mechanism according to one embodiment of the present application. Although the trip and reset mechanisms shown in the drawings are electro-mechanical in nature, the present application also contemplates using semiconductor type trip and reset mechanisms, as well as other mechanisms capable or making and breaking electrical continuity.

Figure 8:
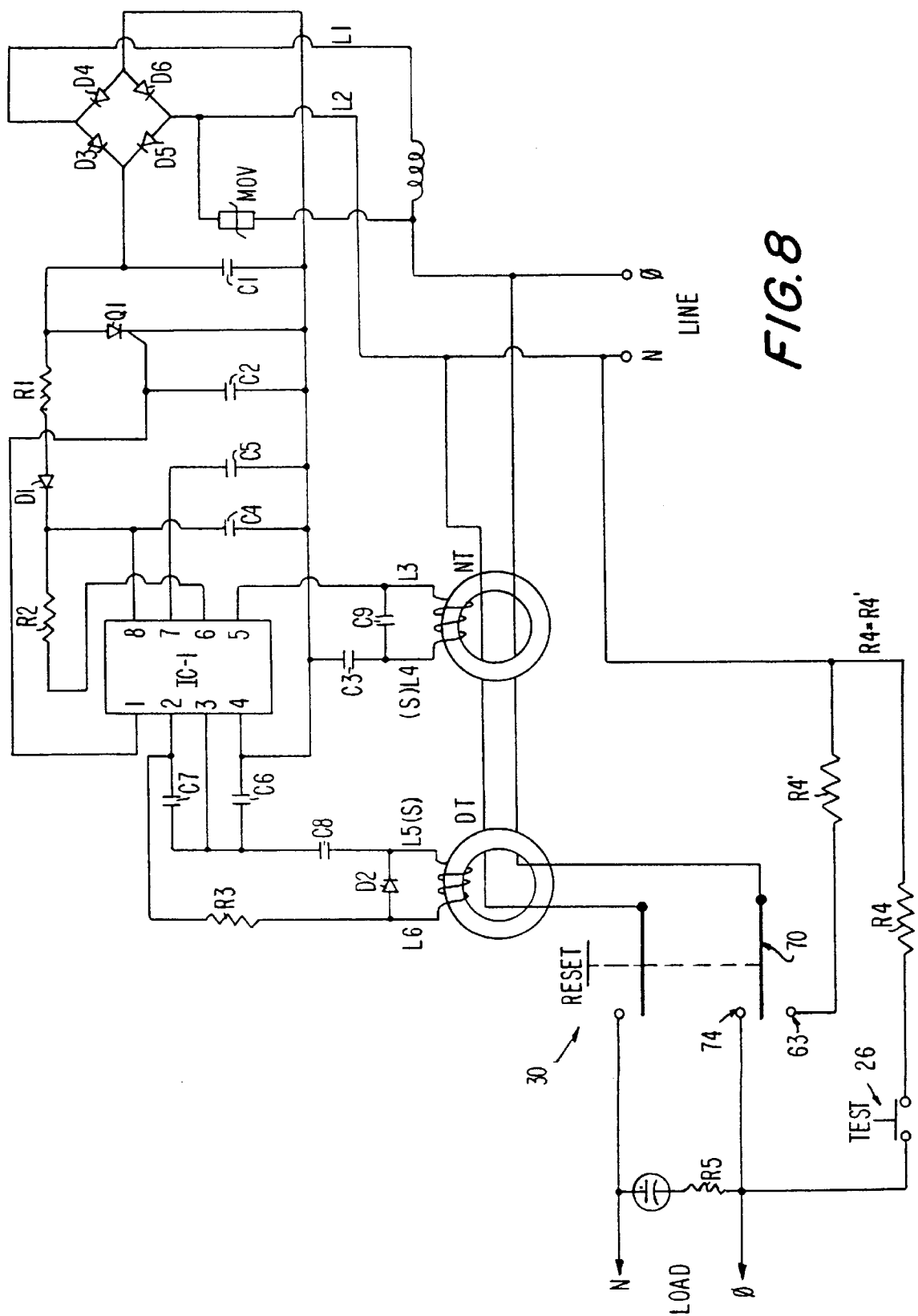
FIG. 8 is a schematic diagram of a circuit for detecting ground faults and resetting the GFCI device of FIG. 1.

The trip mechanism includes a coil assembly 50, a plunger 52 responsive to the energizing and de-energizing of the coil assembly and a banger 54 connected to the plunger 52. The banger 54 has a pair of banger dogs 56 and 58 which are used to set and reset the connection between input and output conductors. The trip mechanism is activated in response to the sensing of a ground fault by, for example, the electronic circuitry shown in FIG. 8. FIG. 8 includes a conventional circuitry for detecting ground faults that includes a differential transformer that senses current inbalances. As noted, the trip mechanism and fault sensing circuitry are included in the circuit interrupter.

The reset mechanism includes reset button 30, movable latching member 60 connected to the reset button 30 and reset contacts 62 and 63 that temporarily activate the trip mechanism when the reset button is depressed. Preferably, the reset contacts 62 and 63 are normally open momentary contacts.

Figure 3:
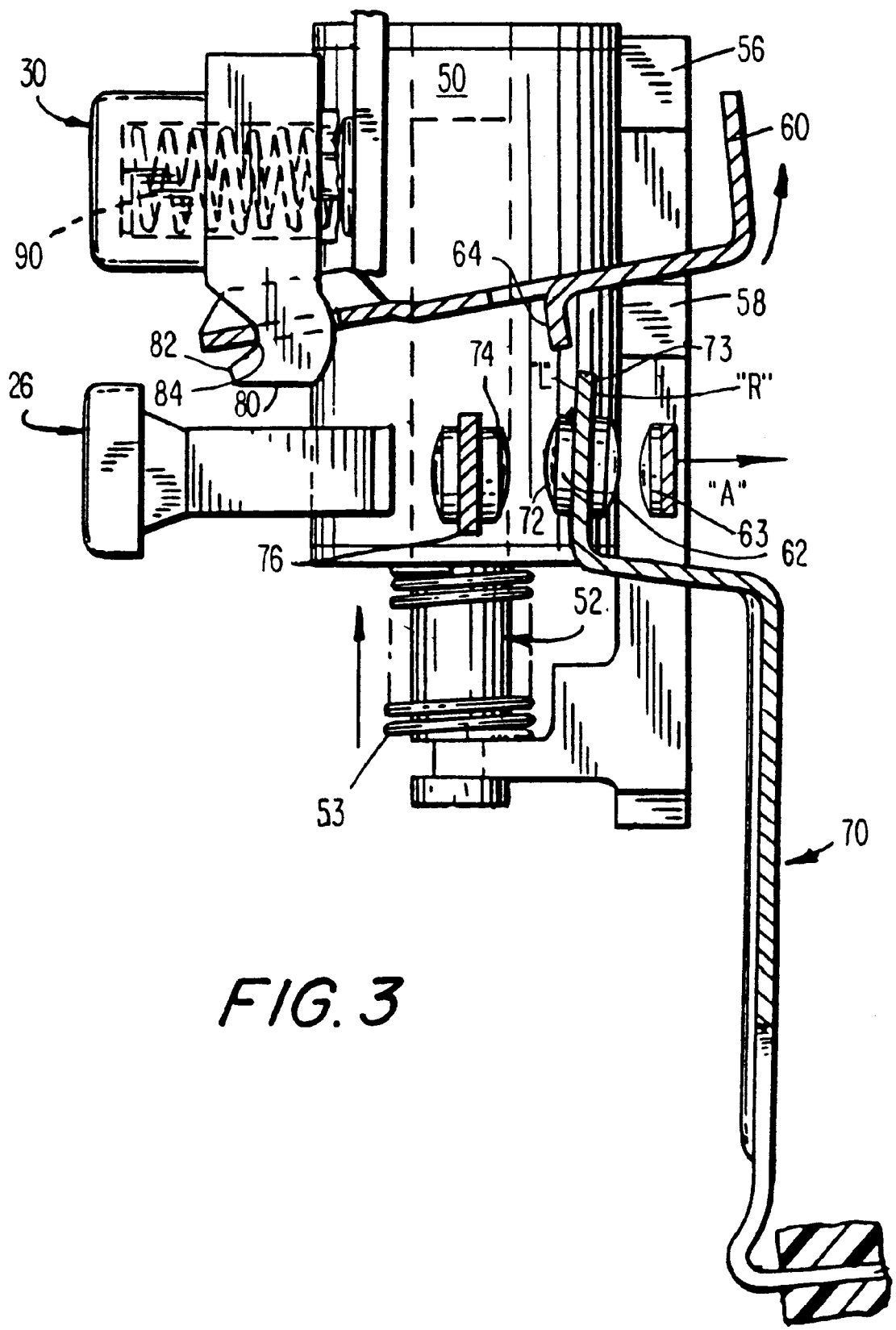
FIG. 3 is a side elevational view similar to FIG. 2, illustrating components of the reset mechanism for the GFCI device in a circuit breaking or interrupting position.
Figure 4:
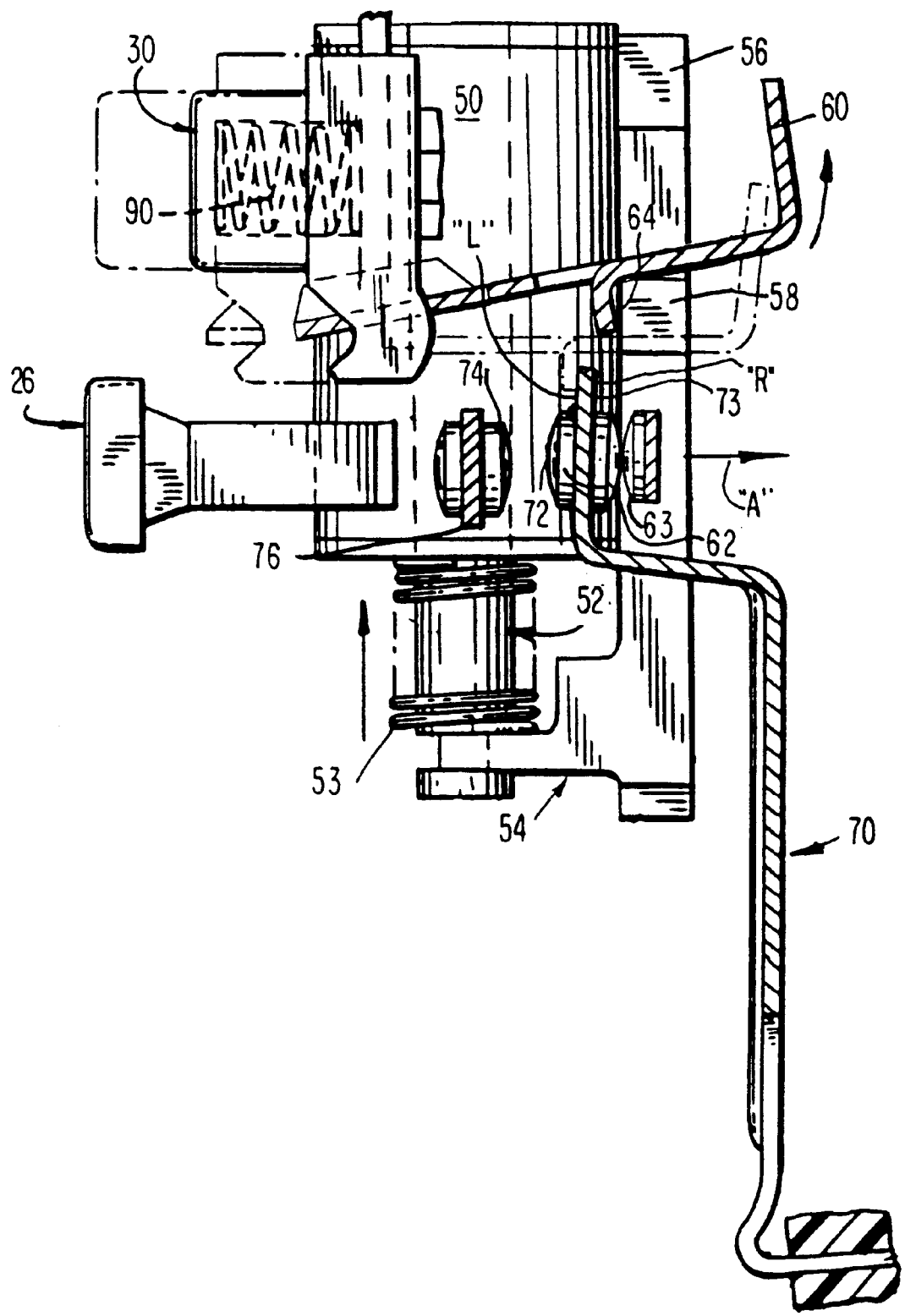
FIG. 4 is a side elevational view similar to FIG. 2, illustrating the components of the reset mechanism after a reset button has been depressed.

FIGS. 2–4 show the mechanical components of the trip and reset mechanisms in various stages of operation. In FIG. 2, the GFCI receptacle is shown in a set position where movable contact arm 70 is in a stressed condition so that movable contact 72 is in electrical engagement with fixed contact 74 of contact arm 76. Referring to FIG. 3, if the sensing circuitry of the GFCI receptacle senses a ground fault or if the test button 26 is depressed, the coil assembly 50 is energized to draw plunger 52 into the coil assembly 50 so that banger 54 moves upwardly. As the banger moves upwardly, the banger front dog 58 strikes the latch member 60 causing it to pivot in a counterclockwise direction about the joint created by the top edge 82 and inner surface 84 of finger 80. The movement of the latch member 60 removes the latching finger 64 from engagement with side R of the remote end 73 of the movable contact arm 70, and permits contact arm 70 to return to its pre-stressed condition opening contacts 72 and 74. It should be noted that the description thus far has been in terms of a single latch member 60 and a single contact arm 70. However, there are preferably two sets of latch members 60 and contact arms 70: one set for the input conductors; and the other set for the output conductors. Further, the banger 54 preferably has two sets of banger dogs: one set for the phase (or hot) conductors; and the other set for the neutral conductors.

Figure 6:
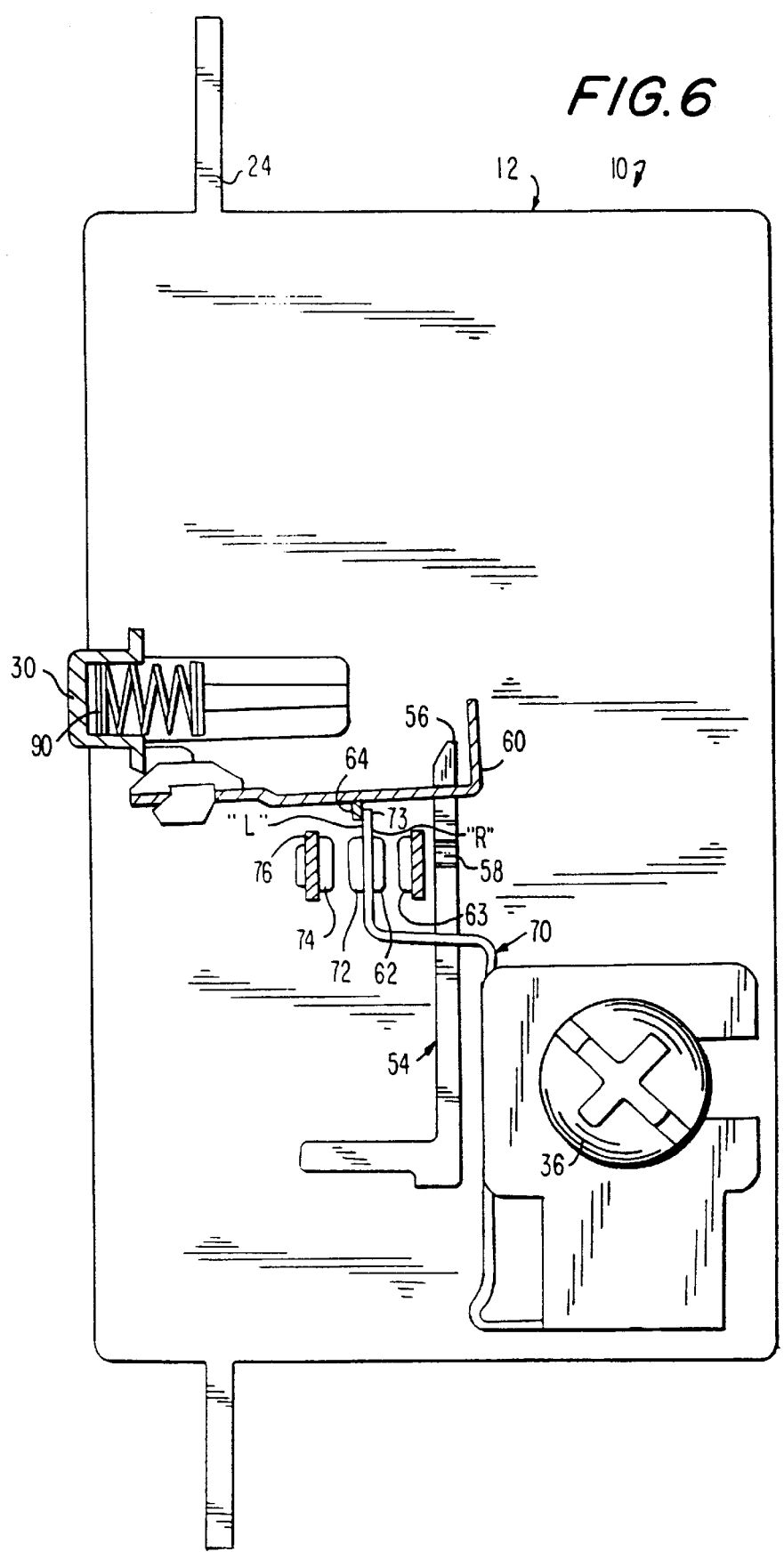

After tripping, the coil assembly 50 is de-energized so that spring 53 returns plunger 52 to its original extended position and banger 54 moves to its original position releasing latch member 60. At this time the latch member 60 is in a lock-out position where latch finger 64 inhibits movable contact 72 from engaging fixed contact 74, as seen in FIG. 6.

Figure 7:
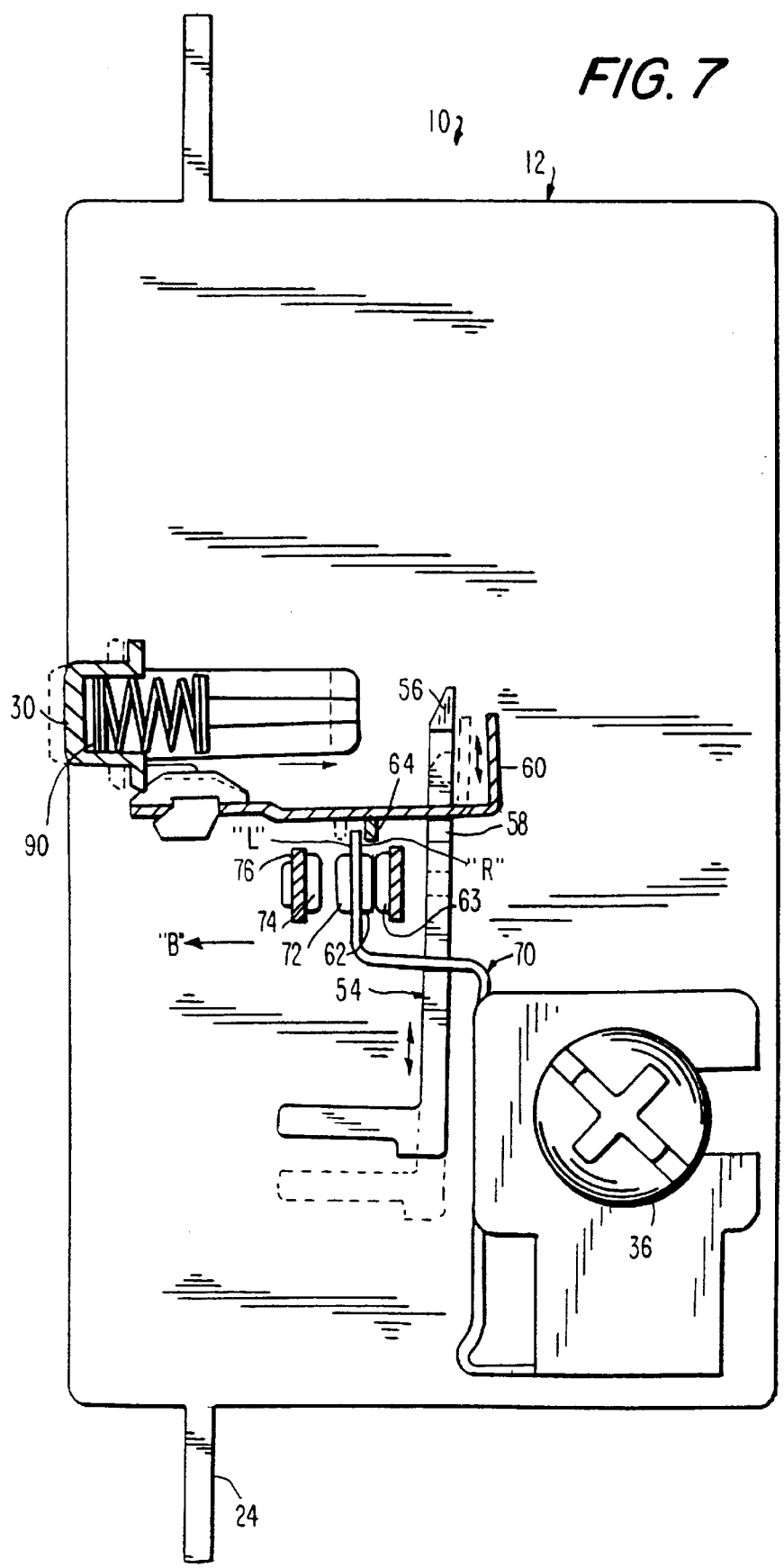

To reset the GFCI receptacle so that contacts 72 and 74 are closed and continuity between the input and output conductors is reestablished, the reset button 30 is depressed sufficiently to overcome the bias force of return spring 90 and move the latch member 60 in the direction of arrow A, seen in FIG. 4. While the reset button 30 is being depressed, latch finger 64 contacts side L of the movable contact arm 70 and continued depression of the reset button 30 forces the latch member to overcome the stress force exerted by the arm 70 causing the reset contact 62 on the arm 70 to close on reset contact 63. Closing the reset contacts completes a test circuit so that the test cycle is activated. As described above, during the test cycle the plunger 52 moves the banger 54 upwardly so that the banger 54 strikes the latch member 60 pivoting the latch finger 64 while the latch member 60 continues to move in the direction of arrow A. As a result, the latch finger 64 is lifted over side L of the remote end 73 of the movable contact arm 70 onto side R of the remote end of the movable contact arm, as seen in FIG. 7.

Figure 5:
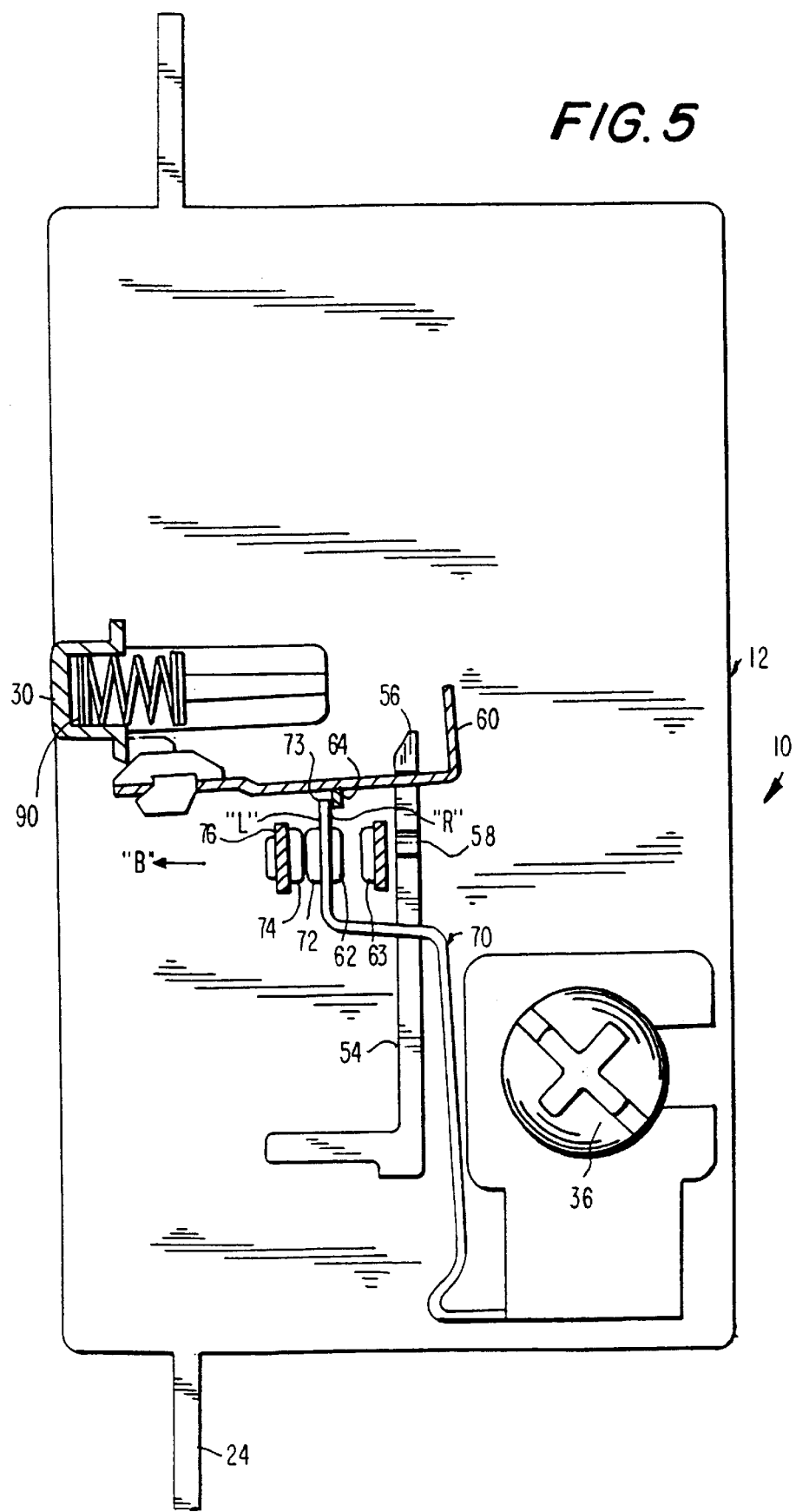
FIGS. 5–7 are schematic representations of one embodiment of the reset mechanism of the present application, illustrating a latching member used to make an electrical connection between input and output conductors and to relate the reset mechanism of the electrical connection with the operation of the trip mechanism.

After tripping, the coil assembly 50 is de-energized so that so that plunger 52 returns to its original extended position, and banger 54 releases the latch member 60 so that the latch finger 64 is in a reset position, seen in FIG. 5. Release of the reset button causes the latching member 60 and movable contact arm 70 to move in the direction of arrow B until contact 72 electrically engages contact 74.

Using the reset lock-out feature described above permits the resetting of the GFCI device or any of the other devices in the family of circuit interrupting devices only if the circuit interrupter (or circuit interrupting mechanism) is operational.

While there have been shown and described and pointed out the fundamental features of the invention as applied to the preferred embodiment, as is presently contemplated for carrying them out, it will be understood that various omissions and substitutions and changes of the form and details of the device described and illustrated and in its operation may be made by those skilled in the art, without departing from the spirit of the invention.

What is claimed:

1. A circuit interrupting device comprising:
    a housing;
    a first electrical conductive path disposed at least partially within said housing and capable of being electrically connected to a source of electricity;
    a second electrical conductive path disposed at least partially within said housing and capable of conducting electrical current to a load when electrically continuity between said first and second electrical conductive paths is made;
    a circuit interrupter disposed within said housing and configured to break the continuity between said first and second conductive paths upon the occurrence of a predetermined condition;

a reset mechanism configured to make electrical continuity between the first and second conductive paths after said predetermined condition occurs; and a reset lock-out that prevents the making of electrical continuity between said first and second conductive paths if said circuit interrupter is non-operational.

2. The circuit interrupting device according to claim 1, wherein said circuit interrupter includes a trip mechanism used to make and break electrical continuity between said first and second electrical conductive paths, and sensing circuitry used to sense the occurrence of said predetermined condition.

3. The circuit interrupting device according to claim 2, wherein said trip mechanism uses electromechanical components to make and break electrical continuity between said first and second electrical conductive paths.

4. The circuit interrupting device according to claim 1, wherein said predefined condition comprises a ground fault, an arc fault, an appliance leakage fault, an immersion fault or a test cycle.

5. A circuit interrupting device comprising:

a housing;

a first electrical conductor disposed at least partially within said housing and capable of being electrically connected to a source of electricity;

a second electrical conductor disposed at least partially within said housing and capable of conducting electrical current to a load when electrically connected to said first electrical conductor;

a circuit interrupter disposed within said housing and configured to cause electrical discontinuity between said first and second conductors upon the occurrence of a predetermined condition;

a reset mechanism configured to reestablish electrical continuity between the first and second conductors after said predetermined condition occurs; and a reset lock-out that prevents reestablishment of electrical continuity between said first and second conductors if said circuit interrupter is non-operational.

6. The circuit interrupting device according to claim 5, wherein said predefined condition comprises a ground fault, an arc fault, an appliance leakage fault, an immersion fault or a test cycle.

7. A ground fault circuit interrupting device comprising:

a housing;

at least one input conductor disposed at least partially within said housing and capable of being electrically connected to a source of electricity;

at least one output conductor disposed within said housing an capable of conducting electrical current to a load when electrically connected to said at least one input conductor;

a circuit interrupter disposed within said housing and configured to break said electrical connection between said input and output conductors in response to the occurrence of a ground fault or test cycle; and a reset mechanism having a reset lock-out responsive to activation of said circuit interrupter so as to be movable between a lock-out position wherein said reset lock-out inhibits resetting of said electrical connection between said input and output conductors and a reset position wherein said reset lock-out does not inhibit resetting of said electrical connection between said input and output conductors, wherein when said reset mechanism is activated said circuit interrupter is activated to facilitates movement of said reset lock-out from said lock-out position to said reset position by said reset mechanism and resets said electrical connection between said input and output conductors.

8. The ground fault circuit interrupting device according to claim 7, wherein said circuit interrupter comprises a coil assembly, a movable plunger responsive to energizing of said coil assembly and a banger attached to said plunger such that movement of said plunger is translated to movement of said banger and movement of said banger causes said reset lock-out to operate in said lock-out position or said reset position.

9. The ground fault circuit interrupting device according to claim 8, wherein said input conductor has an electrical contact attached thereto and said output conductor has an electrical contact attached thereto, and at least one of said conductors is movable relative to the other such that said electrical connection is made when said input and output contacts are closed.

10. The ground fault circuit interrupting device according to claim 9, wherein when said reset lock-out is in said lock-out position said contacts are inhibited from closing.

11. The ground fault circuit interrupting device according to claim 7, wherein said reset mechanism comprises:

a reset button coupled to said reset lock-out; and at least one reset contact that is activated when said reset button is depressed.

12. A circuit interrupting device comprising:

a housing;

a first electrical conductive path disposed at least partially within said housing and capable of being electrically connected to a source of electricity;

a second electrical conductive path disposed at least partially within said housing and capable of conducting electrical current to a load when electrically continuity between said first and second electrical conductive paths is made;

a circuit interrupter disposed within said housing and configured to break the continuity between said first and second conductive paths upon the occurrence of a predetermined condition;

a reset mechanism configured to make electrical continuity between the first and second conductive paths after said predetermined condition occurs; and a reset lock-out that prevents the making of electrical continuity between said first and second conductive paths if an open neutral condition exists.

13. The circuit interrupting device according to claim 12, wherein said predefined condition comprises a ground fault, an arc fault, an appliance leakage fault, an immersion fault or a test cycle.

* * * * *